(12) United States Patent
Ganguly et al.

(10) Patent No.: US 11,531,614 B2
(45) Date of Patent: Dec. 20, 2022

(54) SAVING VIRTUAL MEMORY SPACE IN A CLONE ENVIRONMENT

(71) Applicant: VMWARE, INC., Palo Alto, CA (US)

(72) Inventors: Tanay Ganguly, Bangalore (IN); Zubraj Singha, Bangalore (IN); Goresh Musalay, Bangalore (IN); Kashish Bhatia, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/991,125

(22) Filed: Aug. 12, 2020

(65) Prior Publication Data

US 2021/0374045 A1 Dec. 2, 2021

(30) Foreign Application Priority Data

Jun. 2, 2020 (IN) .............................. 202041023073

(51) Int. Cl.
*G06F 12/02* (2006.01)
*G06F 12/10* (2016.01)

(52) U.S. Cl.
CPC ............ *G06F 12/023* (2013.01); *G06F 12/10* (2013.01); *G06F 2212/1044* (2013.01); *G06F 2212/152* (2013.01)

(58) Field of Classification Search
CPC .............................. G06F 12/023; G06F 16/901
USPC .............................. 711/154, 6, 147, 203, 100
See application file for complete search history.

(56) References Cited

U.S. PATENT DOCUMENTS

| 8,499,114 | B1* | 7/2013 | Vincent | G06F 9/45558 |
| | | | | 711/6 |
| 9,727,273 | B1* | 8/2017 | Dantkale | G06F 11/14 |
| 11,086,545 | B1* | 8/2021 | Dayal | G06F 3/067 |
| 2006/0064549 | A1* | 3/2006 | Wintergerst | G06F 12/121 |
| | | | | 711/134 |
| 2010/0257523 | A1* | 10/2010 | Frank | G06F 9/45558 |
| | | | | 718/1 |
| 2012/0151127 | A1* | 6/2012 | Lim | G06F 12/1009 |
| | | | | 711/206 |

* cited by examiner

*Primary Examiner* — Gautam Sain
*Assistant Examiner* — Edward Waddy, Jr.

(57) ABSTRACT

Virtual memory space may be saved in a clone environment by leveraging the similarity of the data signatures in swap files when a chain of virtual machines (VMs) includes clones spawned from a common parent and executing common applications. Deduplication is performed across the chain, rather than merely within each VM. Examples include generating a common deduplication identifier (ID) for the chain; generating a logical addressing table linked to the deduplication ID, for each of the VMs in the chain; and generating a hash table for the chain. Examples further include, based at least on a swap out request, generating a hash value for a block of memory to be written to a storage medium; and based at least on finding the hash value within the hash table, updating the logical addressing table to indicate a location of a prior-existing duplicate of the block on the storage medium.

20 Claims, 7 Drawing Sheets

SAVING VIRTUAL MEMORY SPACE IN A CLONE ENVIRONMENT

RELATED APPLICATIONS

Benefit is claimed under 35 U.S.C. 119(a)-(d) to Foreign Application Serial No. 202041023073 filed in India entitled "SAVING VIRTUAL MEMORY SPACE IN A CLONE ENVIRONMENT", on Jun. 2, 2020, by VMware, Inc., which is herein incorporated in its entirety by reference for all purposes.

BACKGROUND

Virtual desktop infrastructure (VDI) is a form of desktop virtualization in which desktops and applications (apps) located in the cloud (e.g., on a remote node) are available to users to access from anywhere, using any compatible device that is suitably connected to the proper cloud node. Applications run within virtual machines (VMs) or other virtualization structures with results delivered to users over a network. In some environments, a plurality of clone VMs are spawned from a parent VM, all executing a common set of applications such as a structured query language (SQL) server and an email server.

Each VM consumes memory based on its configured size, plus additional overhead memory for virtualization. The configured size includes the amount of memory that is presented to the guest operating system, although it is independent of the amount of actual physical memory that is allocated to the VM. The physical memory allocated to the VM depends on the resource settings (e.g., shares, reservation, limit) and is maintained by a hypervisor. Regardless of the actual physical memory allocation, the guest operating system operates as though it is running on a dedicated machine with the configured amount of memory.

To enable the guest to operate independently of the actual underlying hardware, the host deploys a memory virtualization technique termed 'hypervisor swapping' that leverages a swap file in the VM folder. If necessary, the hypervisor can directly swap out guest physical memory to the swap file, which will free host physical memory that can be used to provide host physical memory to other VMs. Unfortunately, when there is a large number of clone VMs, the amount of storage space required by the swap files may become burdensome.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosure provides for saving virtual memory space in a clone environment, for example an instant clone environment, by leveraging the similarity of the data signatures expected in swap files when a chain of virtual machines (VMs), which includes clones spawned from a common parent, are executing common applications. Deduplication is performed across the chain, rather than merely within each VM. Examples include generating a common deduplication ID for the chain; generating a logical addressing table linked to the deduplication ID, for each of the VMs in the chain; and generating a hash table for the chain. Examples further include, based at least on a swap out request, generating a hash value for a block of memory to be written to a storage medium; and based at least on finding the hash value within the chain hash table, updating the logical addressing table to indicate a location of a prior-existing duplicate of the block on the storage medium.

BRIEF DESCRIPTION OF THE DRAWINGS

The present description will be better understood from the following detailed description read in the light of the accompanying drawings, wherein.

DETAILED DESCRIPTION

Various aspects of the systems and methods described herein provide at least a solution saving virtual memory space in a clone environment by leveraging the similarity of the data signatures expected in swap files when a chain of virtual machines (VMs), which includes clones spawned from a common parent, are executing common applications. Deduplication is performed across the chain, rather than merely within each VM, thereby identifying a potentially larger number of potentially duplicative blocks for which writing to a storage medium may be avoided. Thus, blocks that are common to multiple VMs, even if they occur only once within each VM, may now be identified as duplicates.

Aspects of the disclosure both increase the speed of computing operations and reduce the burden on storage space by leveraging the identification of duplicative blocks. Operational speed is increased when the time required to write the blocks to the storage medium is precluded. The additional unused space is saved, reducing the burden on the storage space. For example, based at least on not finding a hash value of a block of memory within the chain hash table, the block is written to the storage medium, although based at least on finding the hash value within the chain hash table, a logical addressing table is updated to indicate a location of a prior-existing duplicate of the block on the storage medium (without writing the block to the storage medium).

An instant clone may be created from the running state of another powered on VM (a parent VM) to generate a new VM that is identical to the parent VM. This may be set to occur, for example, at a controlled point in time, and may be used to create numerous clone VMs on a single host computing node. It should be understood however, that aspects of the disclosure may operate with clones that are not instant clones.

Clone VMs may have significant commonality with each other and the parent VM. Aspects of the disclosure recognize that the data signatures in their respective swap files may have useable similarities. These similarities are leveraged across the entire set of clone VMs (for a single parent VM) so that, if one VM's swap file has a block written to the storage medium, all of the other VMs (both clones and the parent) no longer need to wait for a write operation or consume additional space on the storage medium. Absent the availability of the chain hash table (across the VM chain) in the deduplication operations, the other VMs may each be writing duplicates of each other's blocks (even if they each do perform deduplication within their respective swap files). The greater the similarities of the clone VMs to each other and/or the parent VM, the more significant the speed and storage improvements may be with the disclosure. Examples of the disclosure may be advantageously employed, for example, by virtual desktop infrastructure (VDI).

Figure 1:
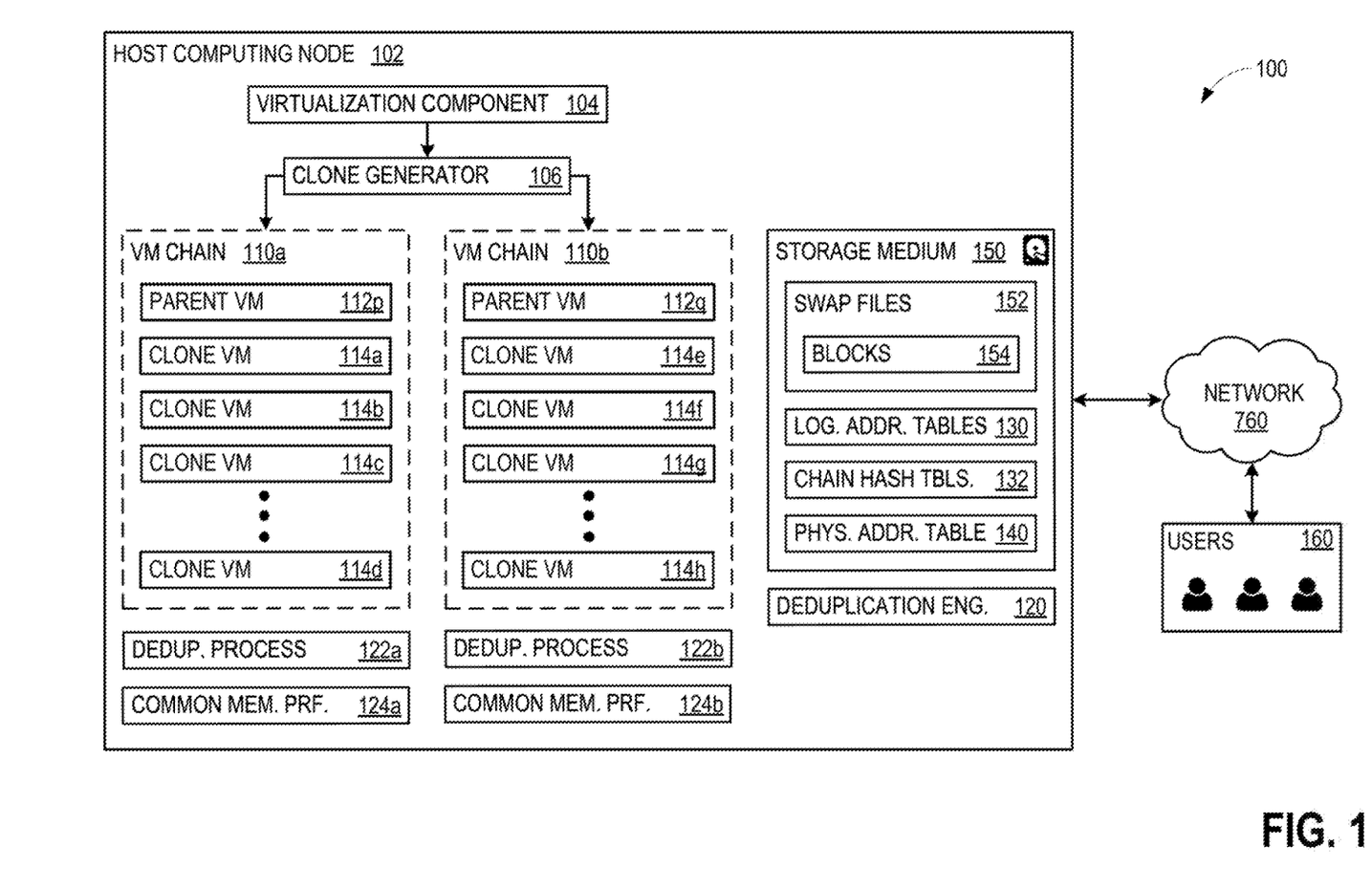
FIG. 1 illustrates a block diagram of an example architecture 100 that can advantageously save virtual memory space in a clone environment.

FIG. 1 illustrates a block diagram of an example architecture 100 that can advantageously save virtual memory space in a clone environment on a host computing node 102. In some examples, computing node 102 is implemented using one or more computing devices 700, of FIG. 7, and provides VDI services to users 160 over a network 760. A virtualization component 104 on computing node 102 provides capabilities to spawn, manage, and execute VMs, for example by triggering a clone generator 106 to create a first clone VM 114a of a first parent VM 112p on computing node 102. Parent VM 112p and clone VM 114a form a first VM chain 110a. Clone generator 106 also generates a plurality of additional clone VMs 114b, 114c, and 114d from parent VM 112p. The plurality of additional clone VMs 114b-114d is also within VM chain 110a. In some examples, the virtualization component 104 is a hypervisor.

In the illustrated example, clone generator 106 further generates a second clone VM 114e of a second parent VM 112q on computing node 110b, and generates a second plurality of additional clone VMs 114f, 114g, 114h from parent VM 112q. Parent VM 112q and clone VM 114e form a second VM chain 110b, and the plurality of additional clone VMs 114f-114h are within VM chain 110b. In some examples, clone generator 106 is an instant clone generator, and clone VMs 114a-114h comprise instant clones. Although only a relatively small number of clone VMs are illustrated, it should be understood that larger sets of clone VMs, numbering into the hundreds or more, may be used in some examples.

Figure 2:
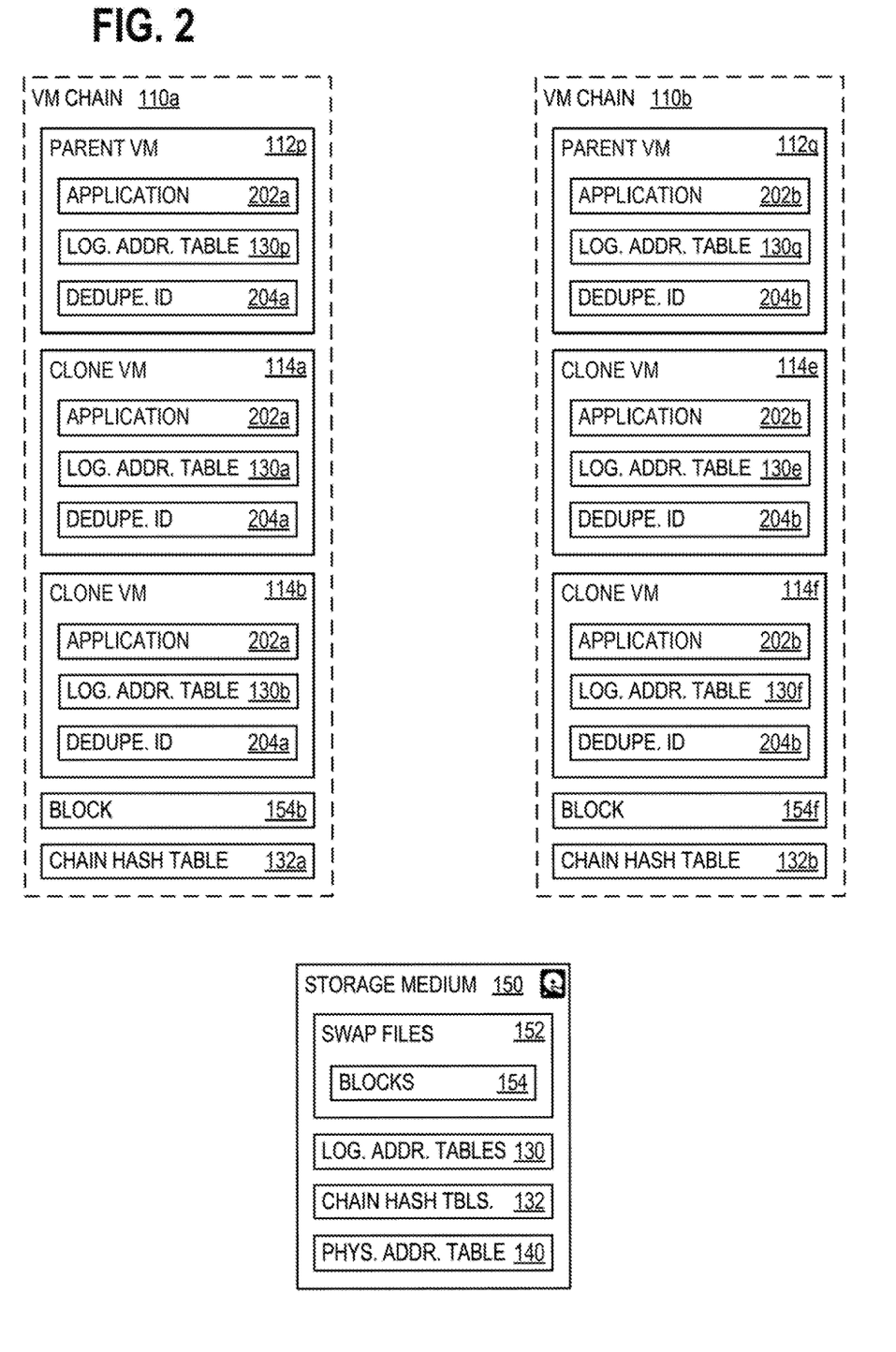
FIG. 2 illustrates select components of FIG. 1 with finer clarity.

FIG. 2 illustrates select components of FIG. 1 with finer clarity, and should be viewed along with the further description of FIG. 1. A hypervisor manages the execution of VMs 112p, 112q, and 114a-114h. As part of the management, it may be necessary to place various instances of the VMs into virtual memory, in order to preserve physical memory of computing node 102. To hold the contents that are to be saved to virtual memory, a set of swap files 152 is created on storage medium 150. This is described in further detail below, in relation to FIG. 3. It is the size of swap files 152 that is to be reduced using the across-chain deduplication processes as described herein. Although storage medium 150 is illustrated as a single entity, it should be understood that storage medium 150 may also represent a plurality of different storage mediums.

When the first instant clone is created from a parent VM (e.g., clone VM 114a being generated from parent VM 112p), a deduplication ID is generated. For example, deduplication engine 120 is used for a first deduplication process 122a for VM chain 110a and a second deduplication process 122b for VM chain 110b. Deduplication processes 122a and 122b run separately for their respective VM chains. Deduplication process 122a generates a first deduplication ID 204a for VM chain 110a, which is propagated to each VM in VM chain 110a, to ensure that each VM within VM chain 110a shares the same deduplication environment. Deduplication process 122a also generates, for each of the VMs 112p and 114a-114d in VM chain 110a, a logical addressing table linked to deduplication ID 204a. For clarity, FIG. 2 illustrates only a limited set of logical addressing tables 130p, 130a, and 130b, although it should be understood that a logical addressing table may exist for all VMs.

In some examples, logical addressing tables 130p, 130a, and 130b are both in-memory and also persisted on storage medium 150. In some examples, logical addressing tables 130p, 130a, and 130b comprise thin-provisioned files. In some examples, logical addressing table 130p has a format of (1) a header that includes deduplication ID 204a, the in-memory location of a chain hash table 132a, the on-disk location of chain hash table 132a, and the size of chain hash table 132a; and (2) block entries for the swap file corresponding to parent VM 112p (e.g., swap file 152p, see FIG. 3). In some examples, logical addressing table 130p is a logical block addressing (LBA) table used for specifying the location of blocks of data stored on computer storage devices. In some examples, the blocks are swap file blocks having a size of 4 kilobytes (KB). As used herein, KB is the standards industry size of 1024 bytes, rather than one thousand bytes.

Deduplication process 122a further generates, for VM chain 110a, chain hash table 132a. Chain hash table 132a is shared by all VMs in VM chain 110a. In some examples, chain hash table 132a has a format of (1) a header that includes deduplication ID 204a, the in-memory location of a physical addressing table 140, the on-disk location of physical addressing table 140, and a unique code number; and (2) hash entries for each block already on storage medium 150, within blocks 154. The hash entries are per block and contain a hash value, a physical addressing table number and a logical addressing table number (to resolve collisions). In some examples, chain hash table 132a is both in a reserved metadata memory section for VM chain 110a and is also persisted on storage medium 150.

Logical addressing tables 130a and 130b may have the same format as logical addressing table 130p. Similarly as for VM chain 110a, deduplication process 122b generates a second deduplication ID 204b for VM chain 110b, which is propagated to each VM in VM chain 110b. This ensures that each VM within VM chain 110b shares the same deduplication environment. Deduplication process 122b also generates, for each of the VMs 112q and 114e-114h in VM chain 110b, a logical addressing table linked to deduplication ID 204b. For clarity, FIG. 2 illustrates only a limited set of logical addressing tables 130q, 130e, and 130f. Deduplication process 122b further generates chain hash table 132b for VM chain 110b. Logical addressing tables 130q, 130e, and 130f and chain hash table 132b may have similar formats and equivalent storage conditions are their equivalents in VM chain 110a. Logical addressing tables 130p, 130q, 130a, 130b, 130e, and 130f are stored within logical addressing tables 130, and chain hash tables 132a and 132b are stored within chain hash tables 132, for the on-disk storage.

Whereas logical addressing points to logical offsets for data storage, physical addressing points to physical offsets where data is stored. In operation, logical addressing may indicate a hash table entry, which then indicates a physical addressing table entry, which identifies a block location on a disk. Multiple logical addressing entries may all indicate a common hash table entry, meaning that multiple logical addressing locations may then overlap for a single physical block stored on disk. This then turns duplicated storage into duplicated indications of a hash table entry, rather than duplicated sections of physical storage.

Physical addressing table 140 may be managed by the underlying filesystem, for example storage medium 150 or another component of computing node 102. For example, physical addressing table 140 may be persisted in a metadata section of a filesystem. In some examples, physical addressing table 140 exists prior to the generation of clone VMs. In some examples, each entry in physical addressing table 140 includes a reference count along with other filesystem specific bookkeeping data. The reference count tracks the number of logical addressing table entries pointing to a particular block on disk. This way, when a block is "deleted" based on one of the logical addressing table entries (but not all), the reference count is decremented—but so long as the reference count remains above zero, the block is not physically deleted from storage medium 150. This prevents one deletion event from removing data whose presence is relied upon by another logical addressing table.

Also as indicated in FIG. 2, each of the VMs in VM chain 110*a*, specifically VMs 112*p*, 114*a*, and 114*b*, are executing at least one common application 202*a*. Similarly, each of the VMs in VM chain 110*b*, specifically VMs 112*q*, 114*e*, and 114*f*, are executing at least one common application 202*b*. This means that the data signatures in swap files 152 should have similarities for the VMs within each chain.

During a swap out operation, a swap out request indicates a particular block of memory to be written to storage medium 150, for example block 154*b* is to be saved in a swap file for clone VM 114*b*. Based at least on the swap out request, deduplication process 122*a* generates a hash value for block 154*b*. The hash value is compared with entries in chain hash table 132*a*. Based at least on finding the hash value within the chain hash table, block 154*b* is not written to storage medium 150 again, but instead, logical addressing table 130*b* is updated to indicate a location of a prior-existing duplicate of block 154*b* that is already on storage medium 150. The time and space that would have been required by writing block 154*b* onto storage medium 150 is thus saved by the disclosure.

If, however, the hash value is not located, block 154*b* is written onto storage medium 150. In some examples, this involves based at least on not finding the hash value within the chain hash table, writing the block to the storage medium; updating the logical addressing table to indicate a location of the block on the storage medium; and updating the chain hash table with the hash value. A similar set of operations occur when a swap out request indicates that block 154*f* is to be saved in a swap file for clone VM 114*f*, which result in either writing block 154*f* or saving the time and space. When swap out operations include amounts of memory that are larger than a block size, the memory is divided into block-size chunks. For example a 16 KB input/output (I/O) operation may be broken into four 4 KB portions.

Figure 3:
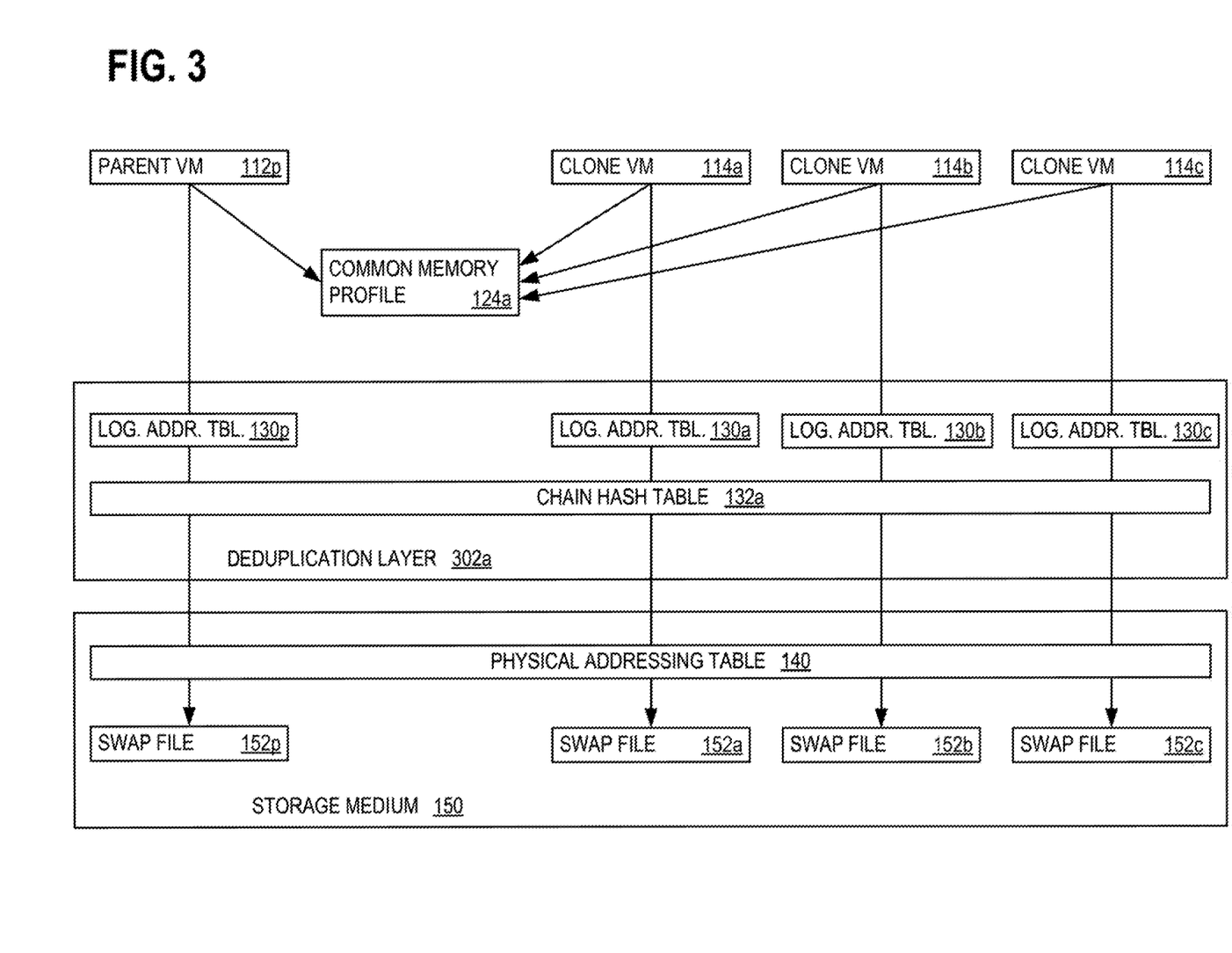
FIG. 3 illustrates data flows among various components of FIG. 1.

FIG. 3 illustrates data flows among various components of FIG. 1. A common memory profile 124*a* indicates similarities in data signatures among the VMs in VM chain 110*a*. Likewise, a common memory profile 124*b* (see FIG. 1) indicates similarities in data signatures among the VMs in VM chain 110*b*. In some examples, common memory profiles 124*a* and 124*b* may be used to manage or optimize swap files for the VMs in the respective VM chains. In some examples, swap file management includes reserving a common swap file size for each of the VMs in VM chain 110*a*.

As illustrated, parent VM 112*p* uses swap file 152*p*, clone VM 114*a* uses swap file 152*a*, clone VM 114*b* uses swap file 152*b*, and clone VM 114*c* uses swap file 152*c*. Before a block of memory from parent VM 112*p* ends up in storage medium 150 as a newly-written manifestation of physical data storage, it passes through the process described above. It is hashed, compared with entries already in chain hash table 132*a*, and only written to storage medium 150 if it is actually new. If it is a duplicate, the reference count in physical addressing table 140 is incremented. In either case, whether the block is newly-written or is referenced to a prior-existing block, logical addressing table 130*p* is updated to indicate its logical location. Similar operations occur for clone VMs 114*a*-114*c*. Swap files 152*p* and 152*a*-152*c* are within swap files 152 of storage medium 150. Together, chain hash table 132*a*, along with swap files 152*p* and 152*a*-152*c*, form a deduplication layer 302*a*.

Figure 4:
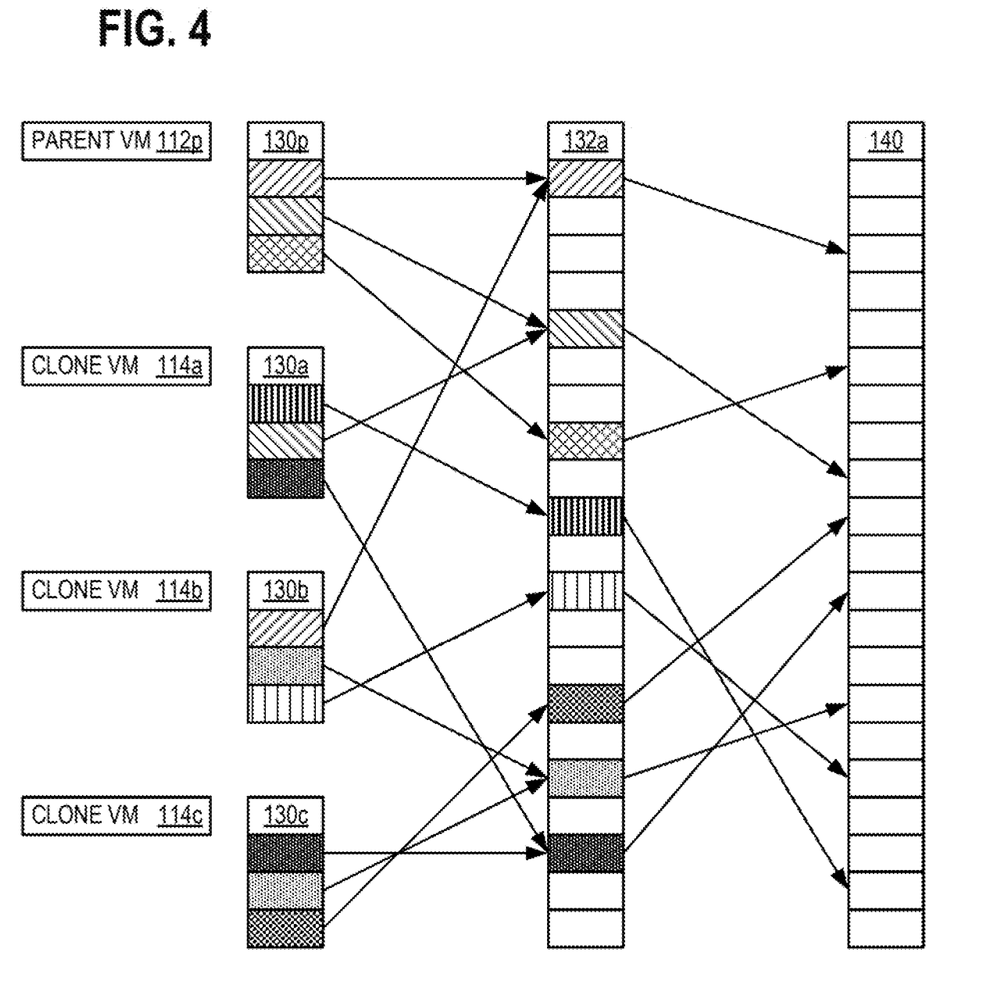
FIG. 4 illustrates additional data flows among various components of FIG. 1.

FIG. 4 illustrates a notional graphical depiction of deduplication data flows using VMs 112*p* and 114*a*-114*c*, logical addressing tables 130*p* and 130*a*-130*c*, chain hash table 132*a*, and physical addressing table 140. Various blocks of memory are to be written to a storage medium, and are filled with patterns to notionally indicate other blocks having the same or different content. As illustrated, some blocks from parent VM 112*p* have the same hash value (indicated by a common pattern fill under the representation of chain hash table 132*a*) as blocks from clone VMs 114*a* and 114*b*. Clone VM 114*a* also has a block with the same hash value as a block from clone VM 114*c*. Other commonalities are also shown. The hash values each correspond to a single entry in physical addressing table 140, which corresponds to a single physical block on storage medium 150. FIG. 4 should be viewed as a notional graphical depiction, however, and it should be understood that the count of blocks, the number of clone VMs, and the number of duplicated blocks may be significantly different in other examples than as in the depicted example.

Figure 5:
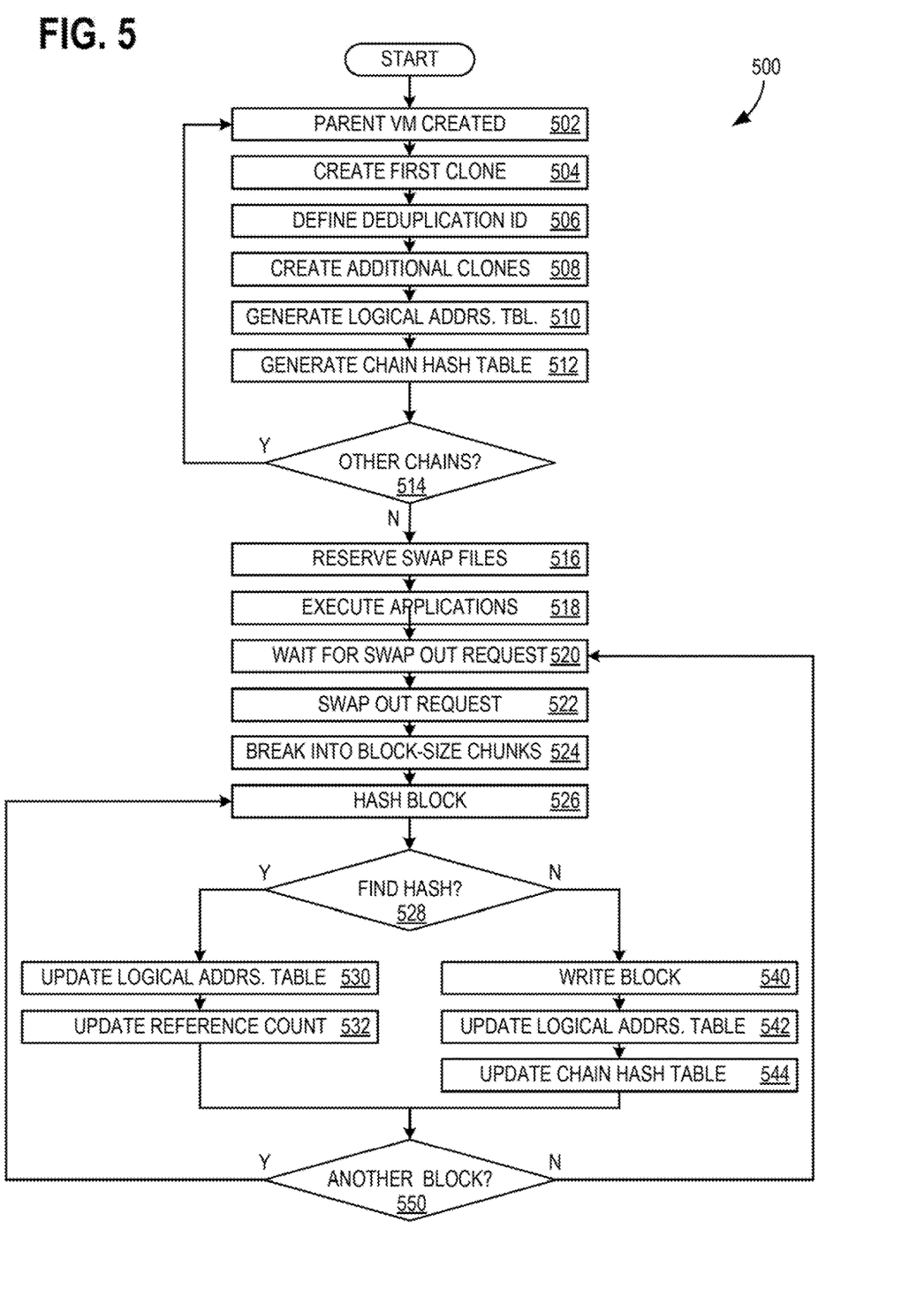
FIG. 5 illustrates a flow chart of exemplary operations associated with saving virtual memory space in a clone environment.

FIG. 5 illustrates a flow chart 500 of an exemplary method of saving virtual memory space in a clone environment. In some examples, the operations of flow chart 500 are performed using one or more computing devices 700 of FIG. 7. A parent VM is created in operation 502, and operation 504 includes creating a first clone VM of a first parent VM on a computing node. The first parent VM and the first clone VM form a first VM chain. Operation 506 includes defining a first deduplication ID for the first VM chain, and operation 508 includes creating a first plurality of additional clone VMs from the first parent VM. The first plurality of additional clone VMs are also within the first VM chain. In some examples, the clone VMs comprise instant clones.

Operation 510 includes generating, for each of the VMs in the first VM chain, a logical addressing table linked to the first deduplication ID. In some examples, the logical addressing tables are in-memory tables. In some examples, the logical addressing tables are thin-provisioned files. With this scheme, the same deduplication ID is used for all clone VMs in a VM chain. Operation 512 includes generating, for the first VM chain, a chain hash table. Decision operation 514 determines whether operations 502-512 are to be repeated for other VM chains. If so, then for the subsequent pass, operations 502-512 include creating a second clone VM of a second parent VM on the computing node, the second parent VM and the second clone VM forming a second VM chain; defining a second deduplication ID for the second VM chain, the second deduplication ID being different than the first deduplication ID; creating a second plurality of additional clone VMs from the second parent VM, the second plurality of additional clone VMs being within the second VM chain; and generating, for each of the VMs in the second VM chain, a logical addressing table linked to the second deduplication ID.

Swap files are created in operation 516, which is some examples may be concurrent with one or more of operations 502-512. Some examples may include reserving a common swap file size for each of the VMs in the first VM chain. Applications are executed within the VMs in operation 518. In some examples, operation 518 includes executing, on each of the VMs in the first VM chain, at least one common application. Operation 520 waits for a swap out request, which arrives in operation 522. A swap out request may indicate the hypervisor is moving memory from one or more VMs into a storage medium in order to free up physical memory on the host computing node. The memory to be moved into a swap file is broken into block-sized chunks in operation 524.

Based at least on a swap out request, operation 526 includes generating a hash value for a block of memory to be written to a storage medium. In some examples, the block is a swap file block. In some examples, the block has a size of 4 KB. Decision operation 528 attempts to find the hash value within the chain hash table. In some examples, the in-memory location of the chain hash table is obtained from the header of the logical addressing table.

If the hash value is found, the block has already been written to the storage medium. Thus, operation 530 includes, based at least on finding the hash value within the chain hash table, updating the logical addressing table to indicate a location of a prior-existing duplicate of the block on the storage medium. The block is not written to the storage medium again. The reference count and metadata in the physical addressing table are updated in operation 532 so that the prior-existing block on the storage medium is not erased prematurely.

If, however, the hash value is not found, the block is new in that it has not yet been written to the storage medium. Thus, operation 540 includes, based at least on not finding the hash value within the chain hash table, writing the block to the storage medium. The filesystem is requested to create a new physical block for the incoming I/O. Operation 542 includes updating the logical addressing table to indicate a location of the block on the storage medium. Operation 544 includes updating the chain hash table with the hash value. That is, once the block allocation is done, the new hash entry allocated will be updated with the physical address index of the new block. Updating the chain hash table permits the newly-written block to be located the next time a duplicate is to be written to the storage medium, so that next write event can be avoided.

Decision operation 550 determines whether another block is included within the swap out request from operation 522. If so, flow chart 500 returns to operation 526 to hash the next block. If not, flow chart 500 returns to operation 520 to await the next swap out request. Because the logical addressing tables and chain hash tables are persisted on disk, for some examples, there may also be block allocations performed for the tables.

Figure 6:
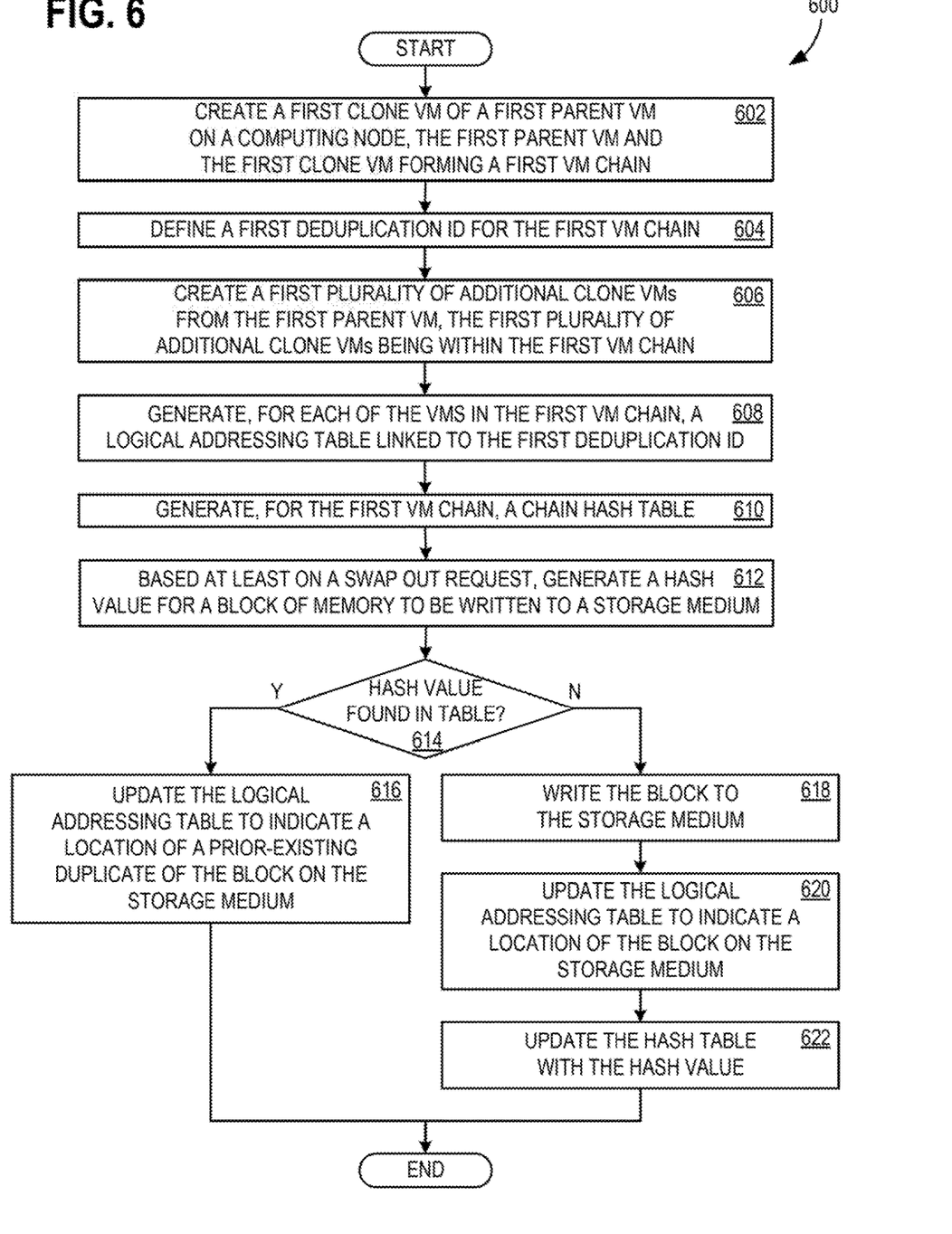
FIG. 6 illustrates another flow chart of exemplary operations associated with saving virtual memory space in a clone environment.

FIG. 6 illustrates a flow chart 600 of an exemplary method of saving virtual memory space in a clone environment. In some examples, the operations of flow chart 600 are performed using one or more computing devices 700 of FIG. 7. Operation 602 includes creating a first clone VM of a first parent VM on a computing node, the first parent VM and the first clone VM forming a first VM chain. Operation 604 includes defining a first deduplication ID for the first VM chain. Operation 606 includes creating a first plurality of additional clone VMs from the first parent VM, the first plurality of additional clone VMs being within the first VM chain. Operation 608 includes generating, for each of the VMs in the first VM chain, a logical addressing table linked to the first deduplication ID. Operation 610 includes generating, for the first VM chain, a chain hash table. Operation 612 includes based at least on a swap out request, generating a hash value for a block of memory to be written to a storage medium.

Decision operation 614 determines whether the hash value generated in operation 610 is found within the chain hash table. Based at least on finding the hash value within the chain hash table, operation 616 includes updating the logical addressing table to indicate a location of a prior-existing duplicate of the block on the storage medium. Based at least on not finding the hash value within the chain hash table, operation 618 includes writing the block to the storage medium; operation 620 includes updating the logical addressing table to indicate a location of the block on the storage medium; and operation 622 includes updating the chain hash table with the hash value.

Figure 7:
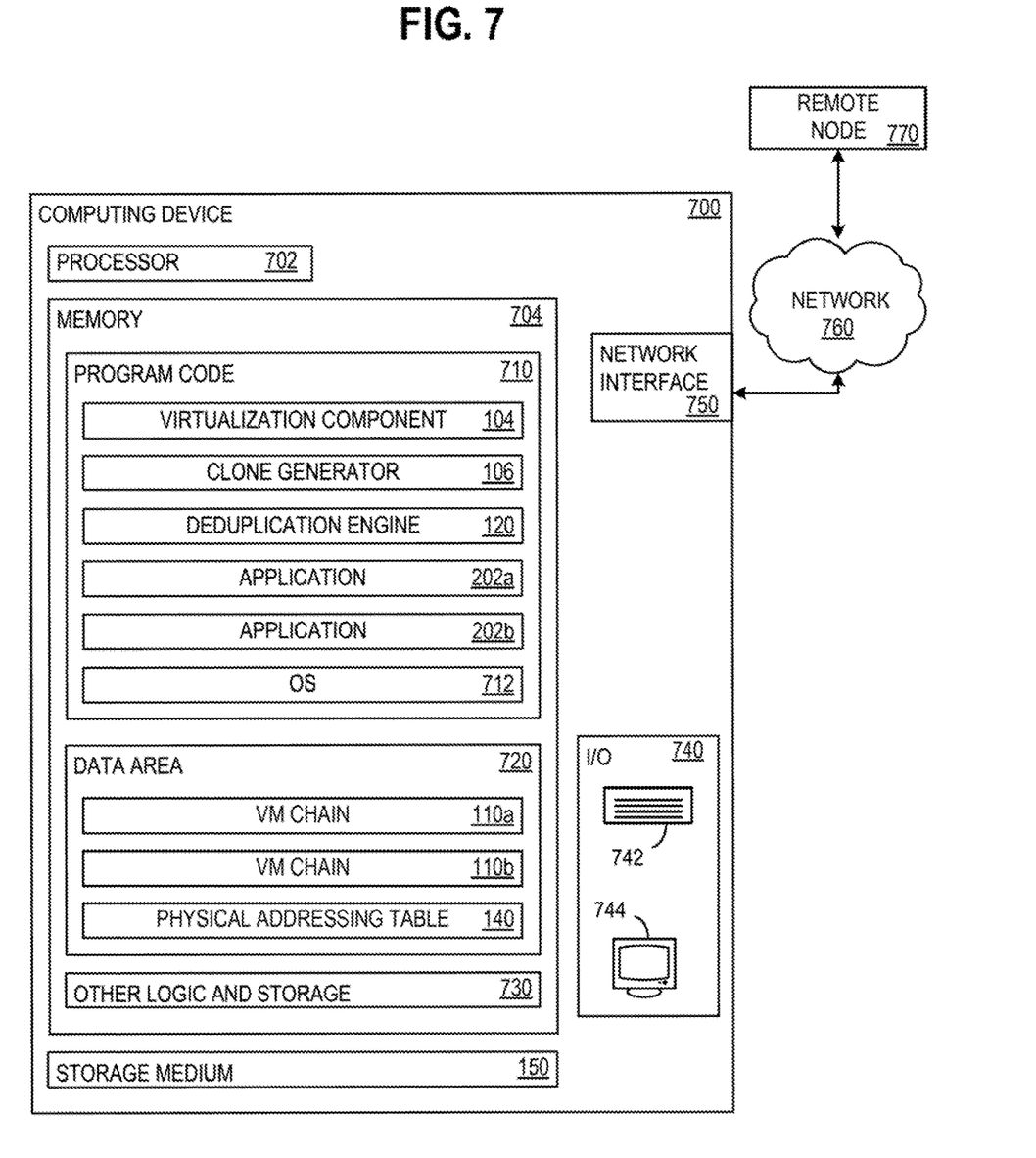
FIG. 7 illustrates a block diagram of a computing device that may be used with the architecture of FIG. 1, according to an example embodiment.

FIG. 7 illustrates a block diagram of computing device 700 that may be used with architecture 100 of FIG. 1. With reference to FIG. 1, computing device 700 may be used for computing node 102 and may be a computer system that is configured to perform the operations described herein. Computing device 700 has at least a processor 702 and a memory 704 that holds program code 710, a data area 720, and other logic and storage 730. Memory 704 is any device allowing information, such as computer executable instructions and/or other data, to be stored and retrieved. Thus, memory 704 is a non-transitory computer readable storage medium storing program code that is executable by processor 702. Program code 710 comprises computer executable instructions, and computer executable components including virtualization component 104, clone generator 106, deduplication engine 120, application 202a, application 202b, and operating system (OS) 712.

Data area 720 holds VM chain 110a, VM chain 110b, and their various components and data files identified above (e.g., logical addressing and chain hash tables). In some examples, data area 720 holds a copy of physical addressing table 140 copied from storage medium 150. Memory 704 also includes other logic and storage 730 that performs or facilitates other functions disclosed herein or otherwise required of computing device 700. A keyboard 742 and a computer monitor 744 are illustrated as an exemplary portion of an I/O component 740. A network interface 750 permits communication over network 760 with remote node 770, which may represent another manifestation of computing device 700, or another arrangement.

Computing device 700 represents any device executing instructions (e.g., as application programs, operating system functionality, or both) to implement the operations and functionality described herein. Computing device 700 may include any portable or non-portable device including a mobile telephone, laptop, tablet, computing pad, netbook, gaming device, portable media player, desktop personal computer, kiosk, embedded device, and/or tabletop device. Additionally, computing device 700 may represent a group of processing units or other computing devices, such as in a cloud computing system or service. Processor 702 may include any quantity of processing units and may be programmed to execute any components of program code 710 comprising computer executable instructions for implementing aspects of the disclosure. In some embodiments, processor 702 is programmed to execute instructions such as those illustrated in the figures.

Additional Examples

An example system for saving virtual memory space in a clone environment comprises: a processor; and a non-transitory computer readable medium having stored thereon program code, the program code causing the processor to: create a first clone virtual machine (VM) of a first parent VM on a computing node, the first parent VM and the first clone VM forming a first VM chain; define a first deduplication ID for the first VM chain; create a first plurality of additional clone VMs from the first parent VM, the first plurality of additional clone VMs being within the first VM chain; generate, for each of the VMs in the first VM chain, a logical addressing table linked to the first deduplication ID; generate, for the first VM chain, a chain hash table; based at least on a swap out request, generate a hash value for a block of memory to be written to a storage medium; based at least on finding the hash value within the chain hash table, update the logical addressing table to indicate a location of a prior-existing duplicate of the block on the storage medium; and based at least on not finding the hash value within the chain hash table: write the block to the storage medium; update the logical addressing table to indicate a location of the block on the storage medium; and update the chain hash table with the hash value.

An exemplary method of saving virtual memory space in a clone environment comprises: creating a first clone VM of a first parent VM on a computing node, the first parent VM and the first clone VM forming a first VM chain; defining a first deduplication ID for the first VM chain; creating a first plurality of additional clone VMs from the first parent VM, the first plurality of additional clone VMs being within the first VM chain; generating, for each of the VMs in the first VM chain, a logical addressing table linked to the first deduplication ID; generating, for the first VM chain, a chain hash table; based at least on a swap out request, generating a hash value for a block of memory to be written to a storage medium; based at least on finding the hash value within the chain hash table, updating the logical addressing table to indicate a location of a prior-existing duplicate of the block on the storage medium; and based at least on not finding the hash value within the chain hash table: writing the block to the storage medium; updating the logical addressing table to indicate a location of the block on the storage medium; and updating the chain hash table with the hash value.

One or more exemplary non-transitory computer storage medium have computer-executable instructions that, upon execution by a processor, cause the processor to at least perform operations that comprise: creating a first clone VM of a first parent VM on a computing node, the first parent VM and the first clone VM forming a first VM chain; defining a first deduplication ID for the first VM chain; creating a first plurality of additional clone VMs from the first parent VM, the first plurality of additional clone VMs being within the first VM chain; generating, for each of the VMs in the first VM chain, a logical addressing table linked to the first deduplication ID; generating, for the first VM chain, a chain hash table; based at least on a swap out request, generating a hash value for a block of memory to be written to a storage medium; based at least on finding the hash value within the chain hash table, updating the logical addressing table to indicate a location of a prior-existing duplicate of the block on the storage medium; and based at least on not finding the hash value within the chain hash table: writing the block to the storage medium; updating the logical addressing table to indicate a location of the block on the storage medium; and updating the chain hash table with the hash value.

Alternatively, or in addition to the other examples described herein, examples include any combination of the following:
  the clone VMs comprise instant clones;
  creating a second clone VM of a second parent VM on the computing node, the second parent VM and the second clone VM forming a second VM chain;
  defining a second deduplication ID for the second VM chain, the second deduplication ID being different than the first deduplication ID;
  creating a second plurality of additional clone VMs from the second parent VM, the second plurality of additional clone VMs being within the second VM chain;
  generating, for each of the VMs in the second VM chain, a logical addressing table linked to the second deduplication ID;
  reserving a common swap file size for each of the VMs in the first VM chain;
  the block has a size of 4 KB;
  executing, on each of the VMs in the first VM chain, at least one common application;
  the block is a swap file block;
  logical addressing tables are in-memory tables; and
  logical addressing tables are thin-provisioned files.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent. The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of saving virtual memory space in a clone environment, the method comprising:
   creating a first clone virtual machine (VM) of a first parent VM on a computing node, the first parent VM and the first clone VM forming a first VM chain;
   defining a first deduplication ID for the first VM chain;
   creating a first plurality of additional clone VMs from the first parent VM, the first plurality of additional clone VMs being within the first VM chain;
   generating, for each of the VMs in the first VM chain, a logical addressing table linked to the first deduplication ID, the logical addressing table having a plurality of entries that point to a same block on a storage medium;
   generating, for the first VM chain, a chain hash table and sharing the chain hash table across all VMs in the first VM chain;
   based at least on a swap out request for writing a block of memory to the storage medium, received from one of the VMs in the first VM chain, generating a hash value for the block of memory to be written to the storage medium;
   based at least on finding the hash value within the shared chain hash table, updating the logical addressing table for the one of the VMs in the first VM chain to indicate a location of a prior-existing duplicate of the block on the storage medium; and
   based at least on not finding the hash value within the shared chain hash table:
   writing the block to the storage medium;
   updating the logical addressing table for the one of the VMs in the first VM chain to indicate a location of the block on the storage medium; and
   updating the shared chain hash table with the hash value.

2. The method of claim 1, wherein each VM in the first VM chain is associated with a swap file, each swap file having a reserved common swap file size.

3. The method of claim 1, further comprising:
   creating a second clone VM of a second parent VM on the computing node, the second parent VM and the second clone VM forming a second VM chain;
   defining a second deduplication ID for the second VM chain, the second deduplication ID being different than the first deduplication ID;

creating a second plurality of additional clone VMs from the second parent VM, the second plurality of additional clone VMs being within the second VM chain; and generating, for each of the VMs in the second VM chain, a logical addressing table linked to the second deduplication ID.

4. The method of claim 1, wherein sharing the chain hash table across all VMs in the first VM chain allows a data block written on the storage medium for one VM in the first VM chain to be shared by all VMs in the first VM chain.

5. The method of claim 1, further comprising:
based on the finding of the hash value within the chain hash table, incrementing a reference count that tracks a quantity of entries pointing to the block on the storage medium.

6. The method of claim 1, wherein a reference count is decremented when an entry in one of the logical addressing tables in the first VM chain that points to the block is deleted, and wherein the block on the storage medium is deleted on determining that a value of the reference count has reached zero.

7. The method of claim 1, further comprising:
executing, on each of the VMs in the first VM chain, at least one common application.

8. A computer system for saving virtual memory space in a clone environment, the computer system comprising:
a processor; and
a non-transitory computer readable medium having stored thereon program code, the program code causing the processor to:
create a first clone virtual machine (VM) of a first parent VM on a computing node, the first parent VM and the first clone VM forming a first VM chain;
define a first deduplication ID for the first VM chain;
create a first plurality of additional clone VMs from the first parent VM, the first plurality of additional clone VMs being within the first VM chain;
generate, for each of the VMs in the first VM chain, a logical addressing table linked to the first deduplication ID, the logical addressing table having a plurality of entries that point to a same block on a storage medium;
generate, for the first VM chain, a chain hash table and share the chain hash table across all VMs in the first VM chain;
based at least on a swap out request for writing a block of memory to the storage medium, received from one of the VMs in the first VM chain, generate a hash value for the block of memory to be written to the storage medium;
based at least on finding the hash value within the shared chain hash table, update the logical addressing table for the one of the VMs in the first VM chain to indicate a location of a prior-existing duplicate of the block on the storage medium; and
based at least on not finding the hash value within the shared chain hash table:
write the block to the storage medium;
update the logical addressing table for the one of the VMs in the first VM chain to indicate a location of the block on the storage medium; and
update the shared chain hash table with the hash value.

9. The computer system of claim 8, wherein each VM in the first VM chain is associated with a swap file, each swap file having a reserved common swap file size.

10. The computer system of claim 8, wherein the program code is further operative to:
create a second clone VM of a second parent VM on the computing node, the second parent VM and the second clone VM forming a second VM chain;
define a second deduplication ID for the second VM chain, the second deduplication ID being different than the first deduplication ID;
create a second plurality of additional clone VMs from the second parent VM, the second plurality of additional clone VMs being within the second VM chain; and
generate, for each of the VMs in the second VM chain, a logical addressing table linked to the second deduplication ID.

11. The computer system of claim 8, wherein sharing the chain hash table across all VMs in the first VM chain allows a data block written on the storage medium for one VM in the first VM chain to be shared by all VMs in the first VM chain.

12. The computer system of claim 8, wherein the program code is further operative to:
based on the finding of the hash value within the chain hash table, increment a reference count that tracks a quantity of entries pointing to the block on the storage medium.

13. The computer system of claim 8, wherein a reference count is decremented when an entry in one of the logical addressing tables in the first VM chain that points to the block is deleted, and wherein the block on the storage medium is deleted on determining that a value of the reference count has reached zero.

14. The computer system of claim 8, wherein the program code is further operative to:
execute, on each of the VMs in the first VM chain, at least one common application.

15. One or more non-transitory computer storage media having computer-executable instructions that, upon execution by a processor, cause the processor to at least perform operations that comprise:
creating a first clone virtual machine (VM) of a first parent VM on a computing node, the first parent VM and the first clone VM forming a first VM chain;
defining a first deduplication ID for the first VM chain;
creating a first plurality of additional clone VMs from the first parent VM, the first plurality of additional clone VMs being within the first VM chain;
generating, for each of the VMs in the first VM chain, a logical addressing table linked to the first deduplication ID, the logical addressing table having a plurality of entries that point to a same block on a storage medium;
generating, for the first VM chain, a chain hash table and sharing the chain hash table across all VMs in the first VM chain;
based at least on a swap out request for writing a block of memory to the storage medium, received from one of the VMs in the first VM chain, generating a hash value for the block of memory to be written to storage medium;
based at least on finding the hash value within the shared chain hash table, updating the logical addressing table for the one of the VMs in the first VM chain to indicate a location of a prior-existing duplicate of the block on the storage medium; and
based at least on not finding the hash value within the shared chain hash table:
writing the block to the storage medium;

updating the logical addressing table for the one of the VMs in the first VM chain to indicate a location of the block on the storage medium; and updating the shared chain hash table with the hash value.

16. The non-transitory computer storage media of claim 15, wherein the computer-executable instructions further comprise:

creating a second clone VM of a second parent VM on the computing node, the second parent VM and the second clone VM forming a second VM chain;

defining a second deduplication ID for the second VM chain, the second deduplication ID being different than the first deduplication ID;

creating a second plurality of additional clone VMs from the second parent VM, the second plurality of additional clone VMs being within the second VM chain; and generating, for each of the VMs in the second VM chain, a logical addressing table linked to the second deduplication ID.

17. The non-transitory computer storage media of claim 15, wherein each VM in the first VM chain is associated with a swap file, each swap file having a reserved common swap file size.

18. The non-transitory computer storage media of claim 15, wherein the computer-executable instructions further comprise:

based on the finding of the hash value within the chain hash table, incrementing a reference count that tracks a quantity of entries pointing to the block on the storage medium.

19. The non-transitory computer storage media of claim 15, wherein a reference count is decremented when an entry in one of the logical addressing tables in the first VM chain that points to the block is deleted, and wherein the block on the storage medium is deleted on determining that a value of the reference count has reached zero.

20. The non-transitory computer storage media of claim 15, wherein chain hash table across all VMs in the first VM chain allows a data block written on the storage medium for one VM in the first VM chain to be shared by all VMs in the first VM chain.

* * * * *